Figure 1:
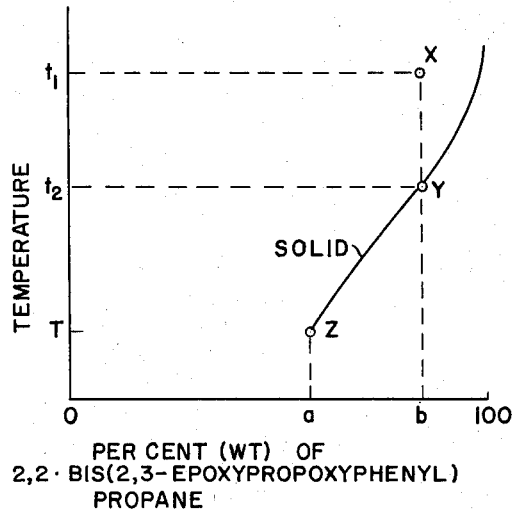

PER CENT (WT) OF
2,2·BIS(2,3-EPOXYPROPOXYPHENYL)
PROPANE

PER CENT (WT) OF
2,2·BIS(2,3-EPOXYPROPOXYPHENYL)
PROPANE

PER CENT (WT) OF
2,2·BIS(2,3-EPOXYPROPOXYPHENYL)
PROPANE

PER CENT (WT) OF
2,2·BIS(2,3-EPOXYPROPOXYPHENYL)
PROPANE

INVENTORS:
G. D. EDWARDS
T. L. KEELEN

BY: *Martin S. Baer*
THEIR ATTORNEY 3,093,662
PRODUCTION OF HIGH PURITY DIEPOXIDE
Granville D. Edwards, Pasadena, and Thomas L. Keelen, Houston, Tex., assignors to Shell Oil Company, New York, N.Y., a corporation of Delaware
Filed Mar. 14, 1960, Ser. No. 14,583
7 Claims. (Cl. 260—348)

This invention relates to an improved method for the production of free-flowing crystals of 2,2-bis(2,3-epoxypropoxyphenyl)propane.

The compound with which this invention is concerned, 2,2-bis(2,3-epoxypropoxyphenyl)propane, is produced by the reaction of epichlorohydrin with 2,2-bis(4-hydroxyphenyl)propane. The last-named phenolic compound is often referred to in industry as "p,p'-bisphenol A" or simply "bisphenol A"; these terms are at times used herein for convenience of reference. Similarly, the compound 2,2-bis(2,3-epoxypropoxyphenyl)propane can be conveniently designated "diglycidyl ether of bisphenol A."

The reaction of epichlorohydrin with bisphenol A to produce a complex mixture of polyglycidyl ethers of bisphenol A is well known. It is described in some detail, for example, in U.S. 2,467,171 to Werner et al. and in U.S. 2,651,589 to Shokal et al. The simplest addition product which is formed in this reaction is the 2:1 addition product, 2,2-bis(2,3-epoxypropoxyphenyl)propane, which can be represented by the formula

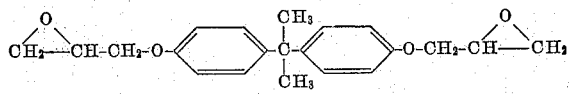

The higher molecular weight addition products which are also formed in the reaction have the general formula

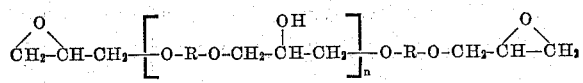

wherein $n$ is an integer and R represents the divalent hydrocarbon radical of the bisphenol. The simplest higher molecular weight product ($n=1$) is the 3:2 addition product of epichlorohydrin and bisphenol A. Still higher molecular weight products contain epichlorohydrin and bisphenol A residues in molar ratios of 4:3, 5:4 and the like. By appropriate control of the ratio of epichlorohydrin to bisphenol A in the reaction and of other reaction conditions, complex mixtures can be produced which contain a relatively high proportion of the diglycidyl ether of bisphenol A, e.g., 70 to 90% by weight or more of the total reaction product, the remainder being mainly the 3:2, 4:3 and higher addition products. However, no method has been described which permits production of the pure diglycidyl ether of bisphenol A directly by the reaction of epichlorohydrin with bisphenol A.

Attempts to produce the diglycidyl ether of bisphenol A had previously resulted only in the recovery of a relatively viscous liquid which still contained some undesirable impurities which affect adversely the utility of epoxy resins prepared therefrom for some special applications.

It has recently been found that the substantially pure diglycidyl ether of p,p'-bisphenol A is capable of existing in crystalline form and that it can be recovered in the form of free-flowing crystals from certain concentrates of the compound by use of controlled crystallization methods. A free-flowing solid is one which exists in the form of discrete relatively small particles which do not agglomerate into large masses and which can be readily poured from a container; examples are dry powder, dry sand, and the like. The substantially pure crystalline product is greatly superior in a number of ways to the less pure form of the compound hitherto known. The crystalline product has a substantially better color, higher epoxy content, lower total chlorine content, lower saponifiable chlorine content, lower total hydroxide content, and lower phenolic hydroxide content; it has a lower viscosity in its liquefied state. The fact that the pure diglycidyl ether of bisphenol A is a free-flowing solid permits it to be used with much greater convenience than the impure product, which exists only in liquid form. Some particularly advantageous applications of the resin are now possible for the first time.

The liquid condensation products of bisphenol A and epichlorohydrin, described in the above-mentioned patents to Werner et al. and Shokal et al., are materials of commerce with a variety of uses. They can be reacted with various known curing agents to produce hard, crosslinked resins, so-called epoxy resins, suitable for use in molding, potting, laminating, surface protection, and the like.

The crystalline products of this invention can be combined with the same curing agents and other ingredients to produce epoxy resins which are at least equal in quality to the resins produced from the liquid condensation products and are superior thereto in some respects, e.g., in their electrical properties.

Crystalline 2,2-bis(2,3-epoxypropoxyphenyl)propane can be recovered by cooling a relatively pure concentrate thereof free of added solvents for a prolonged period of time, but this is not a practical commercial method for producing the crystalline material. A major reason for difficulties in direct crystallization is that the liquid has a relatively high viscosity at the low temperatures required for crystallization and this prevents substantial thermal circulation which is required for easy crystal growth. Other reasons are that impurities usually tend to prevent crystallization and foster supercooling instead.

It was found that the diglycidyl ether of bisphenol A is soluble in many organic solvents, and that many of these solutions are of suitably low viscosity in the temperature range preferred for crystallization, namely, between about 0° and 25° C.

It has now been found that 2,2-bis(2,3-epoxypropoxyphenyl)propane has unusual solubility characteristics. The pure diglycidyl ether may exist as a crystalline solid or as a supercooled liquid below the melting point which is about 43.5° C. Each of these two forms exhibits typical solubility characteristics of other common solids and liquids and these characteristics can become superimposed when solutions of the diglycidyl ether are cooled. It has been found that use of certain solvents having special characteristics which will be described in more detail hereinafter results in great improvements in the recovery of crystalline 2,2-bis(2,3-epoxypropoxyphenyl)propane.

It is an object of this invention to provide an improved method for producing substantially pure 2,2-bis(2,3-epoxypropoxyphenyl)propane in the form of free-flowing crystals. It is a further object to provide a method of recovering free-flowing crystalline 2,2-bis(2,3-epoxypropoxyphenyl)propane by an improved process comprising crystallization from a solution of a liquid concentrate thereof in solvents having certain selected characteristics. It is a further object to provide a method for selecting solvents from which 2,2-bis(2,3-epoxypropoxyphenyl)propane can be recovered in substantial yield and high purity in free-flowing crystalline form. These and other objects of this invention will be better understood from the following description.

This invention will be further explained by means of the drawing in which FIGS. 1 through 4 are solubility diagrams of 2,2-bis(2,3-epoxypropoxyphenyl)propane in different types of solvents.

It has been found that the solubility relationship of 2,2-bis(2,3-epoxypropoxyphenyl)propane in various solvents can be represented by four typical diagrams, as illustrated in FIGS. 1 through 4.

FIG. 1 represents the case of a material which is a very good solvent for both the crystalline and the liquid form of the diglycidyl ether. At temperatures down to T° C. (which may be, for example, 10° C. or 0° C.), there is only a single liquid phase in solutions in which the concentration of 2,2-bis(2,3-epoxypropoxyphenyl)propane in the solution is less than the value "$a$." A composition having a concentration "$b$" of the diglycidyl ether exists as a liquid at a temperature $t_1$; this is represented by the point X. If this solution is cooled to a temperature $t_2$, represented by point Y, and held there until equilibrium is reached, crystals of the diglycidyl ether can just begin to form in the solution. Seeding is ordinarily required to initiate actual crystallization. If the solution is then very slowly cooled to a still lower temperature, crystalline 2,2-bis(2,3-epoxypropoxyphenyl)propane will separate out and the composition of the resulting mixture will follow the curve from point Y to point Z.

Solvents whose characteristics are represented by FIG. 1 (giving to T the value 0° C.) are acetone, for which point "$a$" is at 61%; and methyl isobutyl ketone, for which point "$a$" is at approximately 45%.

Figure 2:
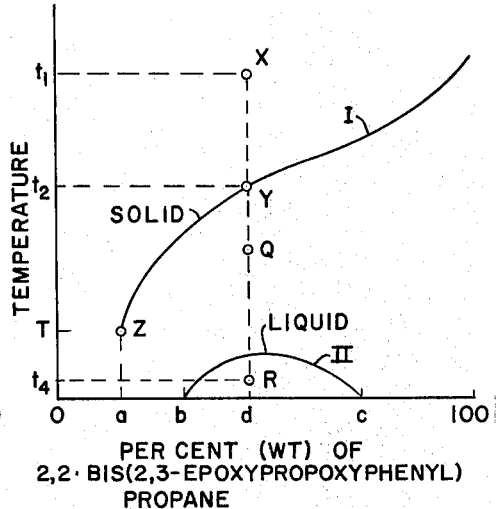

FIG. 2 represents the solubility relationships in a solvent of intermediate quality. Graph I represents the solid phase equilibrium and graph II the equilibrium of the supercooled liquid as a separate phase. In such a solvent, a solution having a relatively low concentration "$a$" of the diglycidyl ether will permit crystal formation to begin when cooled to T° C. From a comparison of graph I of FIG. 2 with the single graph of FIG. 1, it is seen that solid 2,2-bis(2,3-epoxypropoxyphenyl)propane can be recovered at relatively much higher temperatures from an intermediate quality solvent (FIG. 2) having a given concentration thereof than from an excellent solvent (FIG. 1), or conversely, that substantial amounts of the crystalline compound can be recovered at a given temperature from an intermediate quality solvent while relatively little or none could be recovered at the same temperature from a solvent having the characteristics of FIG. 1. Graph II of FIG. 2 shows that at temperatures somewhat below T a liquid phase of 2,2-bis(2,3-epoxypropoxyphenyl)propane will separate from such solutions having concentrations thereof between "$b$" and "$c$." This liquid phase will be observed only if the solution is supercooled to these relatively low temperatures.

To illustrate, if a solution containing "$d$"% of 2,2-bis(2,3-epoxypropoxyphenyl)propane existing at a temperature $t_1$, represented by point X, is gradually cooled to temperature $t_2$, held at that temperature and seeded if necessary, the crystalline compound will begin to separate. If cooling is allowed to proceed very gradually, only the solid form of the compound will be recovered and the composition of the supernatant liquid will gradually follow graph I from point Y to point Z. However, it has been found that extremely long periods of time are required for crystallization to each equilibrium. Therefore, as a practical matter, as the temperature of the composition X is lowered, even with seeding, no solid ordinarily will separate until a point Q is reached and the further change in composition will be a function of the rate of cooling. If a solution of composition "$d$" is cooled very rapidly to a temperature $t_4$, there will be precipitated a liquid phase rich in 2,2-bis(2,3-epoxypropoxyphenyl)propane. It has been found that in such a case crystallization preferentially takes place in the liquid phase of the diglycidyl ether. It has also been found that impurities present in the original solution tend to concentrate in this liquid phase and that, therefore, crystals produced therefrom are relatively impure compared to the crystals produced when no liquid phase of the diglycidyl ether is present. It should be understood, however, that in moderately good solvents, such as represented by FIG. 2, where there is a large separation between graphs I and II, there is little danger of formation of a second liquid phase in a practical cooling operation. Consequently, solvents having a solubility diagram represented by FIG. 2 are the ideal solvents for the practical recovery of 2,2-bis(2,3-epoxypropoxyphenyl)propane as a pure crystalline material. Very few single compounds possess this ideal solubility relationship. Diisobutyl ketone is such a compound. For this solvent, point "$a$" is at a concentration of 13.7% by weight when T is 0° C. It has been found that solvents having the desired relationship can be prepared by mixing suitable proportions of a very good solvent, such as methyl isobutyl ketone, and a relatively poor solvent, such as methyl isobutyl carbinol or a paraffin such as hexane. These mixtures will be discussed in further detail hereafter.

Figure 3:
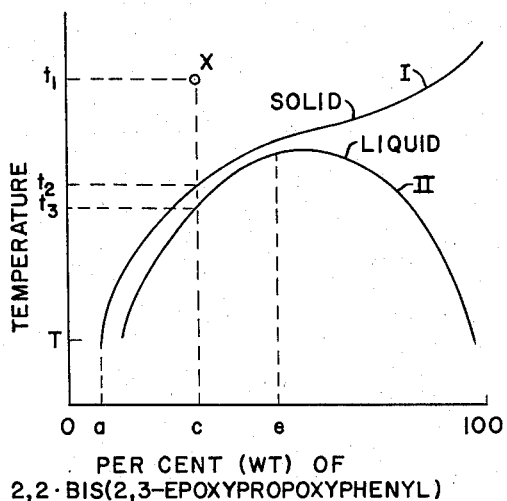

FIG. 3 represents the solubility relationships in a relatively poor solvent. Such a solvent is characterized by a very low solubility of the solid diglycidyl ether at a temperature of T° C., represented by point "$a$." It is particularly characterized by the fact that the solubility relationship of the solid diglycidyl ether, represented by graph I, and of the liquid diglycidyl ether, represented by graph II, are nearly identical until a relatively high concentration "$e$" of the diglycidyl ether in the total solution is reached. Consequently, when a solution represented by X at a temperature $t_1$ is cooled gradually to temperature $t_2$ at which solid first appears when in equilibrium, it would then be necessary, if it is desired to obtain only the solid phase of the diglycidyl ether, to proceed with further cooling at extremely slow rates, avoiding any significant amount of supercooling. As a practical matter, however, it is found that crystals are ordinarily not obtained until some substantial amount of supercooling has taken place. Since the temperature $t_3$ at which a separate liquid phase precipitates is so close to temperature $t_2$, it becomes a practical impossibility to recover crystalline 2,2-bis(2,3-epoxypropoxyphenyl)propane from such solutions without having the liquid phase of the diglycidyl ether present. In these cases, as mentioned with respect to FIG. 2, impurities concentrate in the liquid diglycidyl ether and the crystals form in the liquid diglycidyl ether, resulting in the recovery of relatively impure crystals. Hence, solvents having characteristics of FIG. 3 are not desirable for the recovery of crystalline 2,2-bis(2,3-epoxypropoxyphenyl)propane and are not used in accordance with this invention. Solvents which show this solubility relationship are, for example, a mixture of 30% methyl isobutyl ketone with 70% methyl isobutyl carbinol and a mixture of 65% methyl isobutyl ketone with 35% n-hexane.

Figure 4:
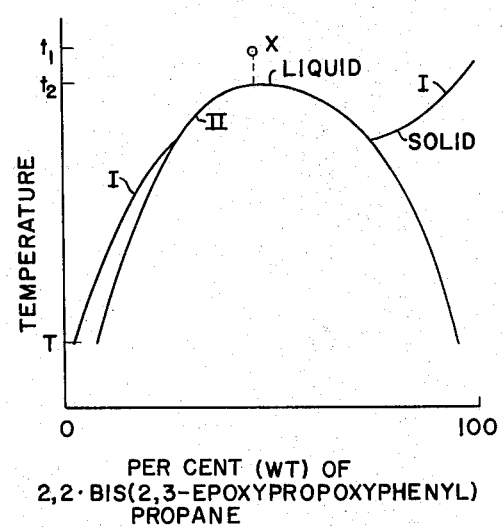

FIG. 4 illustrates a type of solvent which has low solvent ability both for crystalline and liquid 2,2-bis(2,3-epoxypropoxyphenyl)propane. In such a solvent the crystal solubility curve I is interrupted by the area of liquid immiscibility of curve II. In the case of these solvents, when a solution X at temperature $t_1$ is cooled to temperature $t_2$ or below, only a liquid phase of the diglycidyl ether separates. Solid phase is only obtained from solutions having a relatively low or a relatively very high concentration of the diglycidyl ether. When such a solvent is employed, all the crystallization takes place as a rule in the liquid concentrate phase, resulting in the production of relatively impure crystals. Solvents having the characteristics of FIG. 4 are, for example, methanol, methyl cyclohexane, isopropyl alcohol, methyl isobutyl carbinol, a mixture of 20% methyl isobutyl ketone with 80% methyl isobutyl carbinol and a mixture of 60% methyl isobutyl ketone with 40% n-hexane.

In actual practice it is usually necessary to cool well below the solid equilibrium solubility line in order to obtain the crystalline form of 2,2-bis(2,3-epoxypropoxyphenyl)propane from a given solution. For this reason the relationships illustrated in FIG. 2 are the most favorable for obtaining a maximum yield of high purity crystals, since (1) at any concentration the solution may be supercooled sufficiently to promote crystal formation without resulting in the separation of a second, resin-rich liquid phase in which impurities are known to concentrate and (2) the solubility gradient of the solid compound is relatively large so that most of the dissolved material can be crystallized from solution without extreme cooling.

In accordance with this invention, the unusual solubility relationships of 2,2-bis(2,3-epoxypropoxyphenyl)propane are taken advantage of in the recovery of the pure compound in free-flowing crystalline form by preparing a solution of a concentrate thereof in a solvent in which the liquid form of the diglycidyl ether is completely soluble at 10° C. and higher and in which the solid form is soluble to the extent of less than 40% at 15° C. and lower temperatures. The crystalline diglycidyl ether is recovered by cooling said solution at a rate such that the solution is not supercooled to the extent that two liquid phases are formed. From the resulting cooled mixture of solution and crystals, the crystals are then recovered by conventional means such as filtration or centrifuging and washed with suitable wash liquids including, for example, cold solvent containing a high proportion of non-solvent. This can be followed by a wash with a volatile poor solvent for the crystals which is easily removed on drying. The crystals 2,2 - bis(2,3-epoxypropoxyphenyl)propane produced in this manner are of extremely high purity and free-flowing. The greatest dimension of free-flowing crystals recovered according to the invention is generally in the range from 0.02 to 0.3 mm.

The composition of the concentrate employed as starting material in the crystallization is an important factor in the success or failure in producing the crystalline diglycidyl ether of bisphenol A in useful commercial quantities. It was found, for example, that commercially produced concentrates which contain about 70 to 80% of the diglycidyl ether are not suitable starting materials for direct crystallization from solution and that no significant amount of crystals will be produced from such a solution even by seeding and holding at the crystallization temperature. It is believed that the diglycidyl ether of o,p'-bisphenol A and the higher molecular weight addition products of epichlorohydrin and bisphenol A which are present in such concentrates act to inhibit crystallization. When solutions of such concentrates in otherwise useful solvents are cooled, it is found that there is eventually a separation of a heavy liquid phase containing the polyglycidyl ethers of bisphenol A without precipitation of crystalline diglycidyl ether of bisphenol A.

It has also been found that when special care is taken in the reaction between epichlorohydrin and bisphenol A, e.g., by using a bisphenol of high purity such as 95 to 100% instead of somewhat lower purity, e.g., of 90–93% ordinarily employed for commercial operation, or by carrying out the reaction under carefully controlled conditions including lower temperatures than those conventionally employed, it is then possible to produce a concentrate containing, e.g., 85 to 98% of diglycidyl ether of bisphenol A which concentrate may be employed without further treatment as feed stock for the recovery of crystalline diglycidyl ether of bisphenol A.

It has also been found that when a crude condensation product of epichlorohydrin and bisphenol A containing, e.g., 70–85% of the diglycidyl ether is treated by film-type vacuum distillation (e.g., in a falling film-type or wiped film-type still) to recover a distillate containing at least about 90% of the diglycidyl ether, the latter is a suitable feed stock for the direct recovery of crystals of pure diglycidyl ether of bisphenol A by crystallization according to this invention. Similarly, when a concentrate containing 70–85% of the diglycidyl ether is extracted in a liquid-liquid extraction process utilizing suitable solvents such as a mixture of 33% wt. benzene with 67% wt. n-hexane or of 20% wt. acetone with 80% wt. n-hexane, a concentrate containing at least about 90% of the diglycidyl ether is produced which is a suitable feed stock for direct recovery of crystalline diglycidyl ether of bisphenol A by crystallization according to this invention.

Several solvents have been found which give excellent results in the crystallization of pure 2,2-bis(2,3-epoxypropoxyphenyl)propane in accordance with this invention. A pure single compound which may be employed as solvent, if desired, is diisobutyl ketone. Excellent characteristics are provided by certain mixtures of methyl isobutyl ketone (MIBK) and methyl isobutyl carbinol (MIBC). Mixtures of these compounds in MIBK:MIBC ratios from about 83:17 to about 42:58 can be employed; mixtures in the ratio of about 55:45 are especially preferred. Another especially suitable solvent is a mixture of methyl isobutyl ketone and n-hexane or methyl isobutyl ketone and a mixture of hexanes in a MIBK:hexane weight ratio of from 83:17 to 60:40, with the 68:32 ratio mixture being especially preferred.

When another paraffin, e.g., heptanes, n-octane, isooctane, or the like, is employed in the place of hexane together with methyl isobutyl ketone, the ratio relationships are changed only slightly.

From the above discussion of the relative solubilities of liquid and solid 2,2-bis(2,3-epoxypropoxyphenyl)propane in various solvents, it will be possible to prepare similar solubility diagrams for other solvents from which the useful ratios can then be determined.

Solubilities of liquid and solid 2,2-bis(2,3-epoxypropoxyphenyl)propane in a number of single solvents at representative temperature of 0°, 15°, 25°, and 32° C. are given in Table 1.

TABLE 1

*Solubility of Liquid and Solid Diglycidyl Ether of Bisphenol A in Single Solvents*

| Solvent | Percent weight diglycidyl ether | | | | | | | |
|---|---|---|---|---|---|---|---|---|
| | 0° C. | | 15° C. | | 25° C. | | 32° C. | |
| | Liquid | Solid | Liquid | Solid | Liquid | Solid | Liquid | Solid |
| Acetone | M | 61 | M |  | M |  | M |  |
| Methyl isobutyl ketone | M | 43–48 | M | 61.2 | M | 72.6 | M | 87.3 |
| Diisobutyl ketone | M | 13.7 | M | 29.9 | M | 50.2 | M | 79.8 |
| Methanol | 7.45 | 4.36 | 10.59 | 6.78 | 16.5 | [1]14.0 |  |  |
| Isopropyl ether | 5.70 | 3.04 | 7.61 | 3.64 |  |  |  |  |
| Isopropyl alcohol | 1.87 | 1.42 | 3.45 | 2.22 |  |  |  |  |
| Methyl isobutyl carbinol | 1.10 | 0.95 | 2.90 | 2.51 | 4.0 | [1]3.5 |  |  |
| Methyl cyclohexane | 1.12 | 0.82 | 1.88 | 1.15 |  |  |  |  |
| Hexane | 0.53 | 0.38 | 0.92 | 0.70 | 1.2 | [1]1.0 |  |  |
| Isooctane | 0.37 | 0.27 | 0.61 | 0.44 |  |  |  |  |

[1] Accuracy of value uncertain.
NOTE.—M = Completely miscible.

When a particular solvent system has been decided upon, the recovery of the free-flowing crystals of pure 2,2-bis(2,3-epoxypropoxyphenyl)propane from a concentrate thereof is then carried out by preparing a solution containing from 20 to 90% by weight of the concentrate in the solvent, preferably from 40 to 55%, and cooling the solution until the crystallization temperature is reached. At this temperature a small amount of seed crystals of the diglycidyl ether, e.g., from 0.1 to 20% by weight, and preferably from 1 to 5% by weight, based on the diglycidyl ether, is added to the solution. Cooling is continued at a moderate rate, e.g., from 5 to 25° C. per hour, although initial rates of cooling after addition of seed crystals may be as much as 100° C. per hour. The crystallization is carried out in suitable equipment, e.g., in an externally cooled vessel which may be agitated, if desired, or in a continuous circulating system containing a scraped chiller or in various other known types of crystallization apparatus. After the solution has been cooled to a desired low temperature, preferably between 15° and 0° C., it is preferably allowed to stand for an additional period at that temperature to permit crystallization to become substantially complete. The crystals are then separated from the mother liquor by known methods, e.g., by decantation, filtration, or centrifuging. The crystals are then suitably washed by means of a wash solvent which may be the crystallization solvent below the temperature of crystallization or a mixture containing a high proportion of poor solvent and a low proportion of good solvent. This wash may be followed by a volatile poor solvent, e.g., isopentane, which is then removed by vaporization. Free-flowing crystals of 2,2-bis(2,3-epoxypropoxyphenyl)propane of high purity are thus recovered.

We claim as our invention:

1. The method of recovering crystalline 2,2-bis(2,3-epoxypropoxyphenyl)propane which comprises dissolving a mixture resulting from the reaction of epichlorohydrin with 2,2-bis(4-hydroxyphenyl)propane, which contains in excess of 80% by weight of 2,2-bis(2,3-epoxypropoxyphenyl)propane together with undesired impurities, in a solvent selected from the group consisting of mixtures of methyl isobutyl ketone and methyl isobutyl carbinol, mixtures of methyl isobutyl ketone together with a paraffin hydrocarbon of six to eight carbon atoms and diisobutyl ketones, in which liquid 2,2-bis(2,3-epoxypropoxyphenyl)propane is completely soluble at 10° C. and higher temperatures and in which solid 2,2-bis(2,3-epoxypropoxyphenyl)propane is soluble to the extent of less than 40 parts per 100 parts by weight of solution at 15° C., cooling said solution to a temperature at which crystallization takes place, maintaining the solution at a crystallization temperature until a substantial amount of crystallization has taken place, discontinuing cooling at a temperature above that at which liquid 2,2-bis(2,3-epoxypropoxyphenyl)propane appears as a separate phase and removing crystalline 2,2-bis(2,3-epoxypropoxyphenyl)propane as a product from the crystal slurry.

2. The method of recovering crystalline 2,2-bis(2,3-epoxypropoxyphenyl)propane which comprises dissolving a concentrate thereof, containing in excess of 80% by weight of said compound, together with undesired impurities, in a solvent consisting of a mixture of methyl isobutyl ketone and methyl isobutyl carbinol in a weight ratio of from 83:17 to 42:58 at a temperature above 15° C. to produce a solution containing in excess of 30% by weight of the diglycidyl ether, cooling said solution to a temperature between 15° C. and 0° C. at which crystallization takes place, and recovering crystalline 2,2-bis(2,3-epoxypropoxyphenyl)propane from said cooled solution.

3. A process according to claim 2 in which said weight ratio is about 55:45.

4. The method of recovering crystalline 2,2-bis(2,3-epoxypropoxyphenyl)propane which comprises dissolving a concentrate thereof, containing in excess of 80% by weight of said compound, together with undesired impurities, in a solvent consisting of a mixture of methyl isobutyl ketone and hexane in which said compounds are present in a weight ratio of from 83:17 to 68:32 to produce a solution containing in excess of 30% by weight of the diglycidyl ether, cooling said solution to a temperature between 15° C. and 0° C. at which crystallization takes place, and recovering crystalline 2,2-bis(2,3-epoxypropoxyphenyl)propane from said cooled solution.

5. The process according to claim 4 in which said weight ratio is about 68:32.

6. The method of recovering crystalline 2,2-bis(2,3-epoxypropoxyphenyl)propane which comprises dissolving a concentrate thereof, containing in excess of 80% by weight of said compound, together with undesired impurities, in diisobutyl ketone at a temperature above 15° C. to produce a solution containing in excess of 30% by weight of the diglycidyl ether, cooling said solution to a temperature between 15° C. and 0° C. at which crystallization takes place, and recovering crystalline 2,2-bis(2,3-epoxypropoxyphenyl)propane from said cooled solution.

7. A method according to claim 1 in which seed crystals of 2,2-bis(2,3-epoxypropoxyphenyl)propane are added to said solution to initiate said crystallization.

References Cited in the file of this patent

UNITED STATES PATENTS

| | | |
|---|---|---|
| 2,506,486 | Bender et al. | May 2, 1950 |
| 2,765,322 | Beavers | Oct. 2, 1956 |
| 2,805,170 | Bell | Sept. 3, 1957 |

OTHER REFERENCES

Weissberger: Technique of Organic Chem., volume III (1950), pages 363–485 (pages 366, 389, 394–8, 402–14, 471–82 relied on).

Durrans: "Solvents," pages 104, 125 and 126, Van Nostrand, 1957.